S. M. DAVIES.

Lamp-Lighters for Locomotive Head-Lights.

No. 6,181. Reissued Dec. 22, 1874.

WITNESSES

N. C. Ridley

F. F. Warner

INVENTOR

Samuel M. Davies

THE GRAPHIC CO. PHOTO-LITH. 39 & 41 PARK PLACE, N.Y.

UNITED STATES PATENT OFFICE.

SAMUEL M. DAVIES, OF CHICAGO, ILLINOIS.

IMPROVEMENT IN LAMP-LIGHTERS FOR LOCOMOTIVE HEAD-LIGHTS.

Specification forming part of Letters Patent No. 151,361, dated May 26, 1874; reissue No. 6,181, dated December 22, 1874; application filed October 31, 1874.

*To all whom it may concern:*

Be it known that I, SAMUEL M. DAVIES, of Chicago, in the county of Cook and State of Illinois, have invented certain new and and useful Improvements in Lamp-Lighters for Locomotive Head-Lights, of which improvements the following is a full, clear, and exact description, which will enable others skilled in the art to which my invention appertains to make and use the same, reference being had to the accompanying drawing forming a part hereof, and in which—

Figure 1:
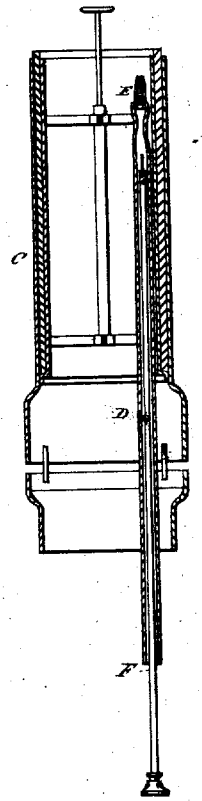
Figure 2:
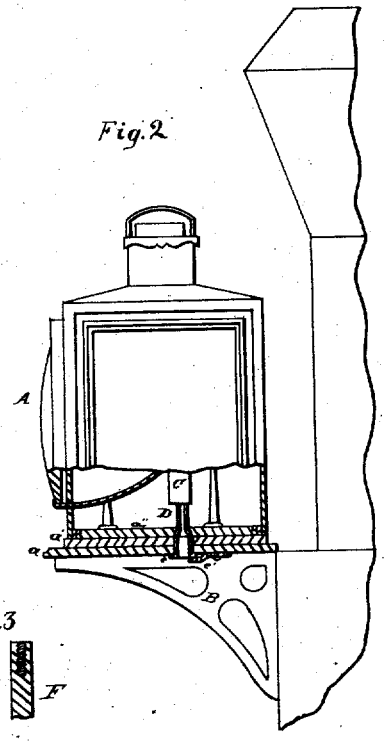

Figure 1 is a vertical longitudinal section of the wick-holder of a locomotive head-light, showing the manner in which my improved ligther may be used in connection therewith; Fig. 2, a side elevation of a locomotive head-light, showing the provision made therein for admitting the stem or torch of my ligther; and Fig. 3, a representation, in detail, of the upper end of the stem.

Like letters of reference indicate like parts.

The object of my invention is to improve the construction and operation of lamp-lighters, so as to adapt them to use in connection with locomotive head-lights, in order that the latter may be thereby readily lighted without opening the door for that purpose.

Figure 3:
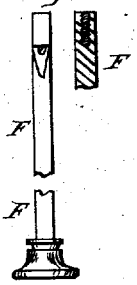

In the drawing, A represents a locomotive head-light, and B is the bracket which supports it. *a* is the shelf of the bracket. *a'* is the bottom of the head-light case, and *a''* is the slide on which the lamp is arranged. *e* is a short tube passing through the parts *a* and *a'*. This tube is preferably flanged at the bottom, as shown, and a small slide, *e'*, may be arranged to cover the opening in the bottom of the tube. C is the wick-holder. D is a vertical tube attached to the inside of the part C. I deem it best to extend the tube D through the slide *a''* to the tube *e*, and to make the latter the largest, and the lower end of the tube D flaring, as shown in Fig. 2. E is a tip or match-igniter, arranged near the upper end of the wick. This tip is contracted at the top, and is there split, so that it will yield or spread outwardly when pressed from within; and its inner surface is roughened or sharpened, and should form a continuation of the tube D when that tube is essential. The tip may be removable. F is a slender rod or stem, sufficiently small to pass freely into the tube D. The rod F is constructed to receive and grasp a match, and for that purpose the upper end of the rod may be provided with a female screw-thread, and it should also be cut away as represented in Fig. 3, so that the match may be readily removed if it should be broken in the rod. This rod is preferably flanged near the bottom, as shown in Fig. 1, so that its upward movement will be thereby limited by the time the prepared end of the match has reached the top of the wick.

In order to use my improved lighter in connection with a head light, a common match (the "parlor-match" is preferable) is inserted into the match-holder. The match is then pushed up through the tube D until the prepared end of the match passes through the igniter and reaches the top of the wick, which is then lighted, the match having been ignited by its passage through the tip, and having been conducted thereto and to the wick by means of the tube D. By this means the head-light is readily lighted without being opened for that purpose, and the match is withdrawn by drawing out the rod F.

Having thus described my invention, what I claim as new, and desire to secure by Letters Patent, is—

1. In a locomotive head-light, the combination of a match-lighter arranged near the wick, and of a conductor, arranged substantially, as specified for the purpose of thereby guiding a match-holder from the outside of the case to the lighter and wick.

2. In combination with the match-holder F, provided with a screw-threaded socket to receive the match, and with a flange to limit the movement of a match when it arrives at the upper end of the wick, the igniter E, arranged near the upper edge of the wick of a locomotive head-light, and the conductor D for conducting the holder F through the head-light case to the igniter, all substantially as shown and described, and for the purpose specified.

SAMUEL M. DAVIES.

Witnesses:
N. C. GRIDLEY,
F. F. WARNER.